United States Patent [19]
Kumaoka

[11] Patent Number: 5,263,070
[45] Date of Patent: Nov. 16, 1993

[54] NUCLEAR REACTOR WITH MULTIPLE INTERNAL HEAT EXCHANGERS

[75] Inventor: Yoshio Kumaoka, Ayase, Japan

[73] Assignee: Kabushiki Kaisha Toshiba, Kawasaki, Japan

[21] Appl. No.: 766,077

[22] Filed: Sep. 27, 1991

[30] Foreign Application Priority Data

Sep. 29, 1990 [JP] Japan .................................. 2-262867

[51] Int. Cl.$^5$ ............................................. G21C 13/00
[52] U.S. Cl. ...................................... 376/406; 376/361; 376/404
[58] Field of Search ................ 376/395, 404, 406, 361

[56] References Cited

U.S. PATENT DOCUMENTS

| 4,842,054 | 6/1989 | Nathenson et al. | 165/104.28 |
| 4,859,402 | 8/1989 | Tupper et al. | 376/285 |
| 4,879,089 | 11/1989 | Kenworthy et al. | 376/399 |
| 4,905,757 | 3/1990 | Boardmann et al. | 376/405 |
| 4,908,180 | 3/1990 | Kiehlmann et al. | 376/361 |
| 4,983,353 | 1/1991 | Boardmann et al. | 376/283 |
| 5,013,519 | 5/1991 | Nakamura et al. | 376/406 |

OTHER PUBLICATIONS

"Construction of the world's full scale fast breeder reactor", M. Banal (Nersa/EdF) et al., Nuclear Engineering International, published on May, 1978.

Primary Examiner—Donald P. Walsh
Assistant Examiner—Frederick H. Voss
Attorney, Agent, or Firm—Oblon, Spivak, McClelland, Maier & Neustadt

[57] ABSTRACT

A tank type nuclear reactor comprises an outer shielding wall structure, a reactor vessel installed in the shielding wall structure and provided with an inner sealed space in which a primary liquid coolant circulates, a reactor core disposed in the reactor vessel and charged with a number of fuel assemblies, a core support structure disposed to a bottom of the reactor vessel, a partition wall structure disposed on the core support structure defining the inner space of the reactor vessel into a hot pool region and a cold pool region, intermediate heat exchangers disposed in the reactor vessel for carrying out heat exchanging operation between the liquid coolant flow from the hot pool region and a secondary side heat medium, and electromagnetic pumps disposed in the reactor vessel for feeding the primary coolant into the core. The partition wall structure has a vertically cylindrical wall structure including a lower portion constituting a core tank portion surrounding an outer periphery of the core. Core cooling heat exchangers are further disposed on an outer peripheral wall side of the partition wall structure and provided with a top portion of a level substantially equal to or below a top portion of the core.

8 Claims, 6 Drawing Sheets

NUCLEAR REACTOR WITH MULTIPLE INTERNAL HEAT EXCHANGERS

BACKGROUND OF THE INVENTION

The present invention relates to a nuclear reactor and more particularly to a tank type fast breeder reactor improved in its structure and maintenance or inspection performance.

As well known, a conventional tank type fast breeder reactor generally comprises a reactor vessel having an inner sealed space in which a coolant such as liquid metal is circulated and a reactor core (merely called a core hereinlatter) disposed in the reactor vessel. The interior of the reactor vessel is divided by a partition wall structure into a hot pool region disposed on the upper side of the core and a cold pool region disposed below the hot pool region. An intermediate heat exchanger carrying out a heat exchanging operation between the coolant and a secondary heat medium (secondary coolant) is disposed in the hot pool region and a pump means for feeding the coolant to the core is disposed in the cold pool region.

When such fast breeder reactor is operated, the coolant is fed from the cold pool to the core by the operation of the pump means and then heated in a fuel assembly constituting a core. The coolant is first flown upwardly in the core and then drained into the upper hot pool. The coolant drained into the hot pool is subjected to the heat exchanging operation with the secondary heat medium in the intermediate heat exchanger, through which the coolant is then drained into the cold pool.

Such a tank type fast breeder reactor is shown in, for example, "Construction of the world's first fullscale fast breeder reactor" M. Banal (Nersa/EdF) et al., Nuclear Engineering International, May 1978.

In the reactor shown in such literature, the partition wall is built from the inner peripheral surface of the core in an inverted cone shape, and eight intermediate heat exchangers and four pumps are hung from a reactor roof through the partition wall structure in penetrating manners. In the general conventional technology for the tank type reactor, many machineries and equipments are secured to the partition wall structure in penetrating manner.

In inspections of the tank type reactor, these machineries and equipments have been visually inspected at the operation stopping state of the reactor, and in such case, when a coolant essentially formed of an opaque liquid metal fills in the reactor vessel, the visual inspection could not be adequately performed. Accordingly, the inspections are carried out by lowering the liquid level of the coolant in the core directly below the core top portion so that the upper portion of the core top portion at which many machineries and equipments are arranged is exposed externally.

In such inspection operation of the described tank type reactor, however, all the fuels arranged in the core had to be preliminarily taken out from the reactor vessel in order to lower the liquid surface level of the coolant below the core top portion, thus being inconvenient and troublesome.

In the case of stopping the reactor operation for the periodical inspection or maintenance, decay heat is generated from the fuel in the core, and hence, it is necessary to cool the coolant for the predetermined period after the stopping of the reactor operation. In this viewpoint, in the conventional tank type reactor, the removal of this decay heat is carried out by the intermediate heat exchangers. However, the intermediate heat exchangers are arranged, because of their function, at an upper portion of the hot pool region, and hence, the intermediate heat exchangers cannot attain their function when the liquid surface level of the coolant is lowered below the core top portion. In this meaning, it is also necessary to take out all the fuels from the reactor vessel for lowering the liquid surface level of the coolant, resulting in the reactor operation stopping for relatively long period, thus also being inconvenient and troublesome.

Furthermore, as described hereinbefore, the conventional tank type reactor has a complicated structure in which many machinaries or equipments such as heat exchangers and pumps are arranged in penetration through the partition wall structure. Such complicated structure requires much labor for the removal, inspection and maintenance thereof in addition to the long operation stopping period of the reactor, thus being inconvenient in the reactor running, economical and other points.

SUMMARY OF THE INVENTION

An object of the present invention is to substantially eliminate defects or drawbacks encountered in the prior art and to provide a nuclear reactor having a structure capable of easily removing various machinaries or equipments arranged in the reactor vessel and visually performing inspection and maintenance thereof.

This and other objects can be achieved according to the present invention by providing a tank type nuclear reactor comprising an outer shielding wall structure, a reactor vessel installed in the shielding wall structure and provided with an inner sealed space in which a primary liquid coolant circulates, a reactor core disposed in the reactor vessel and charged with a number of fuel assemblies, a core support structure disposed to a bottom of the reactor vessel, a partition wall structure disposed on the core support structure defining the inner space of the reactor vessel into a hot pool region and a cold pool region, intermediate heat exchangers disposed in the reactor vessel for carrying out heat exchanging operation between the liquid coolant flown from the hot pool region and a secondary side heat medium, and electromagnetic pumps disposed in the reactor vessel for feeding the primary coolant into the core, wherein the partition wall structure has a vertically cylindrical wall structure including a lower portion constituting a core tank portion surrounding an outer periphery of the core and core cooling heat exchangers are further disposed on an outer peripheral wall side of the partition wall structure and provided with a top portion of a level substantially equal to or below a top portion of the core.

In preferred embodiments, the partition wall structure is provided with coolant flow holes facing the electromagnetic pumps, the intermediate heat exchangers and the core cooling heat exchangers. The coolant flow holes facing the core cooling heat exchangers are closed or opened by selectively changing charging orientation of the fuel assemblies disposed on a peripheral side of the core during reactor running period or reactor operation stopping period.

The partition wall structure has a vertical cylindrical structure including a lower cylindrical portion constituting a core tank portion and an upper cylindrical portion having an inner diameter larger than that of the lower cylindrical portion, and in this case, the intermediate heat exchangers are disposed in the hot pool region inside the upper cylindrical portion of the partition wall structure. The partition wall structure may have a vertical cylindrical structure including a lower cylindrical portion constituting a core tank portion and an upper cylindrical portion having an inner diameter substantially equal to that of the lower cylindrical portion, and in this case, the intermediate heat exchangers are disposed in the cold pool region outside the upper cylindrical portion of the partition wall structure.

According to the nuclear reactor of the characters described above, in the steady reactor operation, the coolant is supplied by the operation of the pump into the core from the cold pool through the lower portion of the partition wall structure, heated and flown upward in the core and drained into the hot pool from the upper portion of the core. The coolant in the hot pool is flown into the intermediate heat exchanger in which heat exchanging operation is performed between the first coolant and the secondary heat medium, thus being cooled, and the coolant is thereafter drained into the cold pool disposed outside the partition wall structure.

In the while, during the reactor operation stopping period, the decay heat of the core can be removed by the heat exchanging operation of the core cooling heat exchanger disposed outside in the cold pool. Since the core cooling heat exchanger has a top portion of the level substantially equal to or below a top portion of the core and the heat exchanging operation can be done between this heat exchanger and the coolant flown out through the holes formed to the partition wall structure, the decay heat removal can be safely carried out even in a case where the coolant is partially drained externally to the reactor vessel to lower the liquid surface level of the coolant to a level of the core top portion. The holes of the partition wall structure can be closed in the reactor steady operation period and opened in the reactor operation stopping period.

BRIEF DESCRIPTION OF THE DRAWINGS

For a better understanding of the present invention and to show how the same is carried out, reference is first made, by way of preferred embodiments, to the accompanying drawings, in which.

DESCRIPTION OF THE PREFERRED EMBODIMENTS

A first embodiment according to the present invention will be described hereunder with reference to FIGS. 1 to 7.

Figure 1:
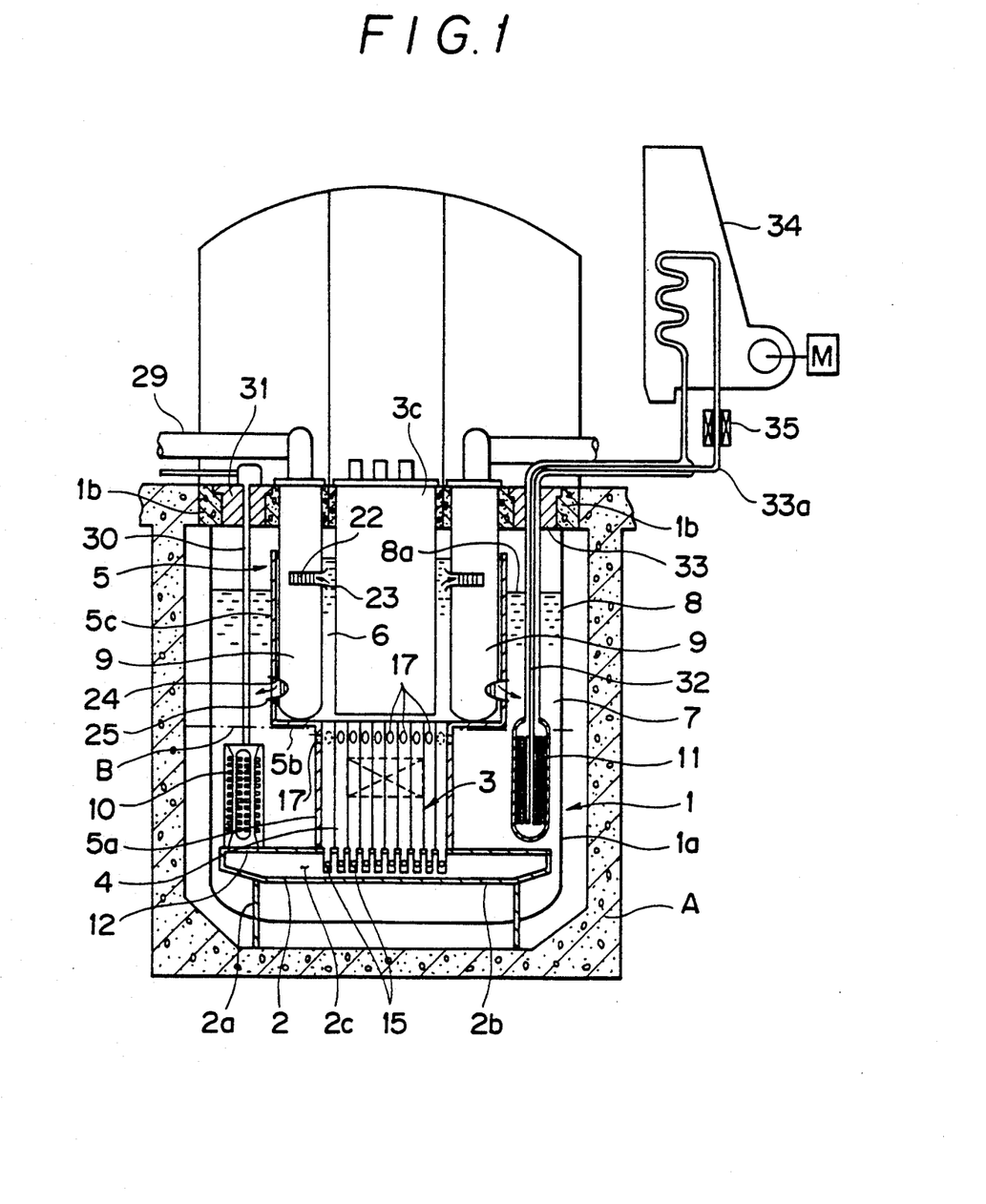
FIG. 1 is an elevational section of a tank type nuclear reactor according to one embodiment of the present invention.
Figure 2:
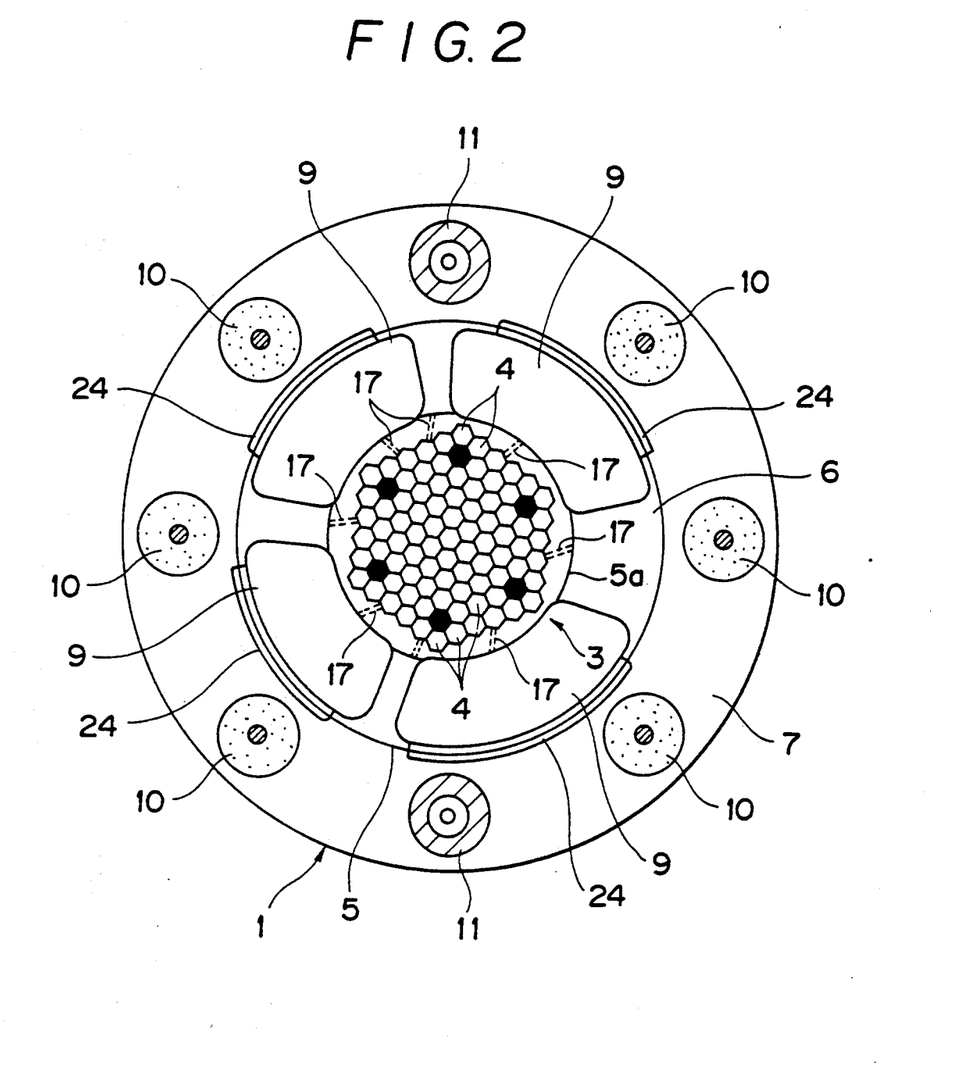
FIG. 2 is a plan view of a reactor containment disposed in the reactor shown in FIG. 1 for showing an interior thereof.

Referring to FIGS. 1 and 2, a reactor vessel 1 having an inner space sealed by a vessel body 1a and a roof slab 1b is disposed in an outer biological shielding wall A made of such as concrete. A reactor core 3 is installed on a core support structure 2 provided on the bottom portion of the reactor vessel 1, and the core 3 is charged with a number of fuel assemblies 4. A cylindrical partition wall structure 5 is disposed on the core support structure 2 in a vertical fashion so as to surround the outer peripheral surface of the core 3. An inner hot pool 6 and an outer cold pool 7 are defined in the reactor vessel 1 by the partition wall structure 5, the hot pool 6 being inside and the cold pool 7 being outside. A coolant 8 such as composed of liquid metal is accommodated in these hot and cold pools 6 and 7.

Within the hot pool 6 are arranged intermediate heat exchangers 9 for carrying out heat exchanging operation between the primary coolant 8 and a secondary heat medium (secondary coolant), and within the cold pool 7 are arranged core cooling heat exchangers 11 and pump means 10 for feeding the primary coolant 8 into the core 3 through the core support structure 2. A core upperstructure 3c incorporating a control rod driving mechanism is also arranged above the core 3 in the reactor vessel 1.

The respective constructional equipments described above will be described in detail hereunder.

First, as shown in FIG. 1, the core support structure 2 is disposed for the purpose of supporting the lower portions of the fuel assemblies 4 constituting the core 3 and is composed of a support leg 2a and a support body 2b of a hollow horizontal plate structure. The interior of the hollow body 2b is formed as a coolant plenum 2c into which the lower portions of the fuel assemblies 4 are inserted. The plenum 2c is provided with a communication port 12 through which the interior of the plenum 2c is communicated with a drain port of the pump means 10.

Figure 3:
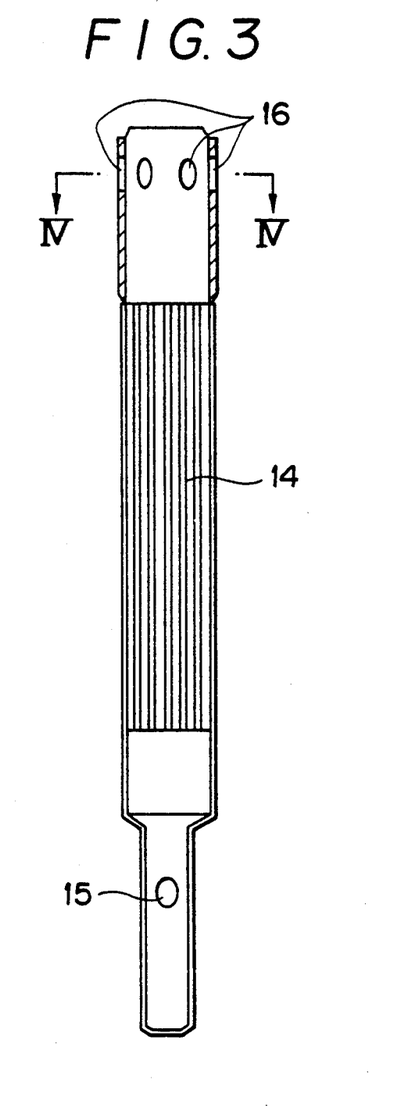
FIG. 3 is an elevational view, partially in section, of a fuel assembly.
Figure 4:
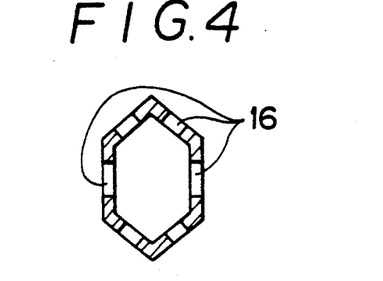
FIG. 4 is a sectional view taken along the line IV—IV of FIG. 3.
Figure 5:
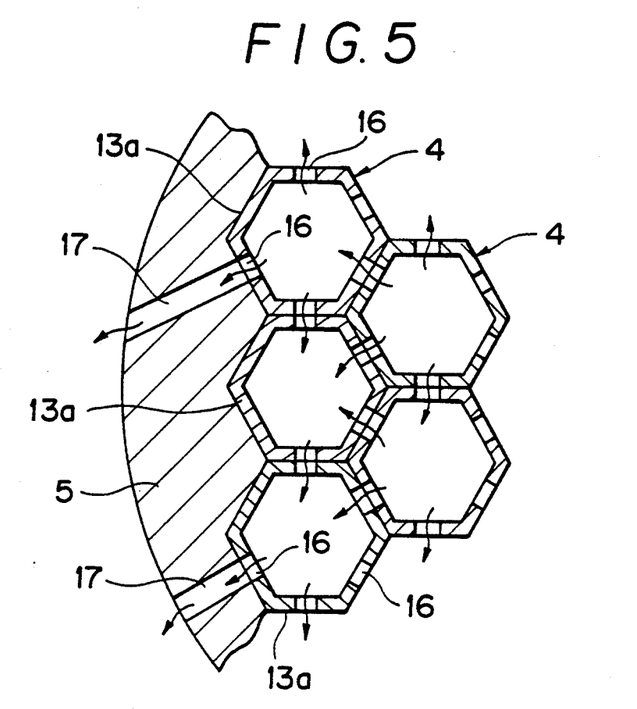
FIG. 5 is a partial sectional view of a core tank portion at a time of a reactor running period.

As shown in FIGS. 1 to 6, each of the fuel assemblies 4 comprises a wrapper tube 13a having a regular polyigonal cross section into which a plurality of fuel pins 14 are arranged. A plurality of such fuel assemblies 4 are assembled in a bundle in a fuel box so that the respective side walls of the wrapper tubes 13a of the adjacent assemblies 4 are tightly contacted to each other as shown in FIG. 1 or 2, thus constructing the core 3. As shown in FIGS. 3 and 4, the lower portion of each of the fuel assemblies 4 is provided with a coolant flow-out port 15 communicated with the plenum 2c formed in the support structure body 2b and the upper portion of the fuel assembly 4 is provided with coolant flow-out ports 16 formed to all the flat side portions of the peripheral walls of a fuel box 13. As shown in FIG. 5, the coolant flow-out ports 16 of one fuel assembly 4 are communicated with those of the adjacent fuel assembly 4 and some of them are also communicated with coolant flow-out ports 17 penetrating the partition wall structure 5.

Figure 6:
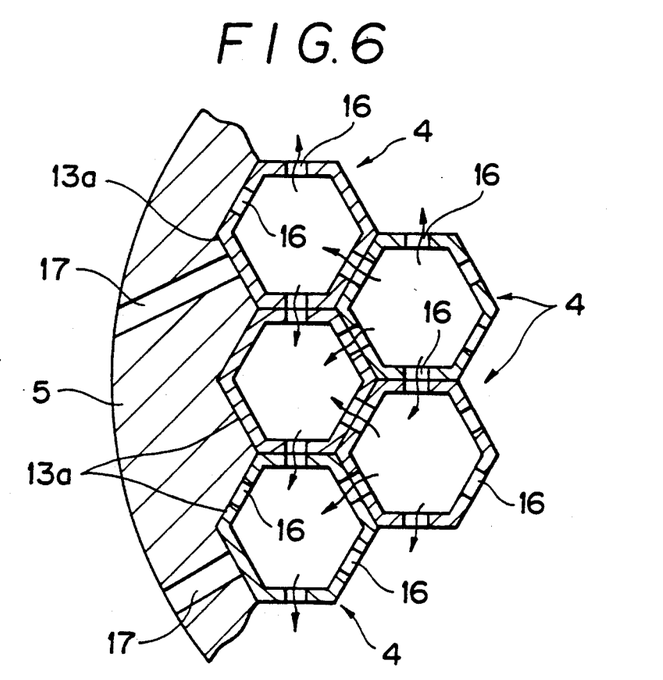
FIG. 6 is a view similar to that of FIG. 5 at a time of a reactor operation stopping period.

However, the fuel assembly 4 arranged to the peripheral portion of the core 3 comprises the wrapper tube 13a having some peripheral walls provided with no coolant flow-out port 16. Accordingly, as shown in FIG. 6, the coolant flow-out port 17 is closed by changing the charging orientation of such wrapper tube 13a in the core 3.

As shown in FIGS. 1 and 2, the partition wall structure 5 first extends vertically from the core support structure 2 upwardly along the peripheral wall of the core 3, and this vertical portion is formed as a core tank portion 5a. The partition wall structure 5 has a flanged portion 5b extending horizontally from the upper end of the vertical portion 5a of the structure 5 and has a further vertical portion 5c, having a larger inner diameter, extending the outer end of the flanged portion 5b towards a portion near the upper end of the reactor vessel 1. The coolant flow-out ports 17 are formed to the partition wall structure 5 at the upper portion of the core tank portion 5a.

Figure 7:
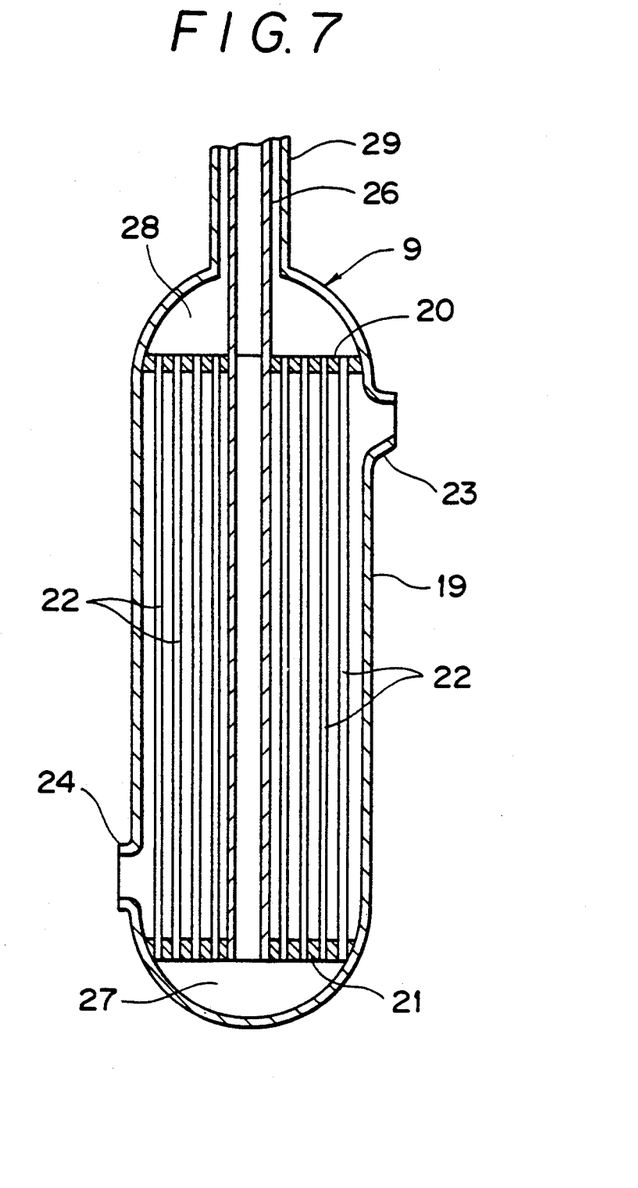
FIG. 7 is a elevational sectional view of an intermediate heat exchanger disposed in the reactor containment.

The hot pool 6 is defined inside of the upper vertical portion 5c of the partition wall structure 5 and a plurality, four for example, of intermediate heat exchangers 9 are arranged along the inner peripheral surface of the vertical portion 5c. These intermediate heat exchangers 9 are suspended from the roof slab 1b, and as shown in FIG. 7, for example, each of the intermediate heat exchangers 9 has a vertically extended casing 19 in which a plurality of straight heat tubes 22 are accommodated with upper and lower ends thereof being supported by upper and lower tube plates 20 and 21. To the upper portion of the peripheral wall of the casing 19 is formed a nozzle port 23 as a coolant inlet and to the lower portion thereof is also formed a nozzle port 24 as a coolant outlet. The coolant outlet 24 is communicated with the cold pool 7 through a port 25 formed to the partition wall structure 5.

The primary coolant flown from the hot pool 6 into the intermediate heat exchangers 9 through the coolant inlets 23 is subjected to the heat exchanging operation between the primary coolant and the secondary heat medium as the second coolant passing the heat transfer tubes 22 during the flow-down in the casing 19 along the outer periphery of the heat transfer tubes 22, and the primary coolant is then flown out into the cold pool 7 through the coolant outlets 24. The secondary heat medium flows downwardly in an inner tube 26 of the heat exchanger 9 into a lower plenum 27 formed in the casing 19, then flown upwardly into an upper plenum 28 through the heat transfer tubes 22 and finally is drained to an external equipment through an outer tube 29.

The pump means includes a plurality of pumps 10 composed of an electromagnetic pump, for example, and in the illustrated embodiment, six pumps 10 are arranged in the cold pool 7 at portions along the outer periphery of the partition wall structure 5. Each of the electromagnetic pumps 10 has a vertical height substantially equal to or slightly lower than that of the core 3. The electromagnetic pump 10 has a drain port communicated with a communication port 12 of the core support structure 2 thereby to supply the coolant 8 in the cold pool 7 into the core 3 through the plenum 2c. The electromagnetic pump 10 is driven by an electric power supplied through a cable 30 which is led, at one end, externally through a pump cover 31 provided for the roof slab 1b.

As shown in FIGS. 1 and 2, a plurality, two in this embodiment, of the reactor cooling heat exchangers 11 are disposed in the cold pool 7 on the outer peripheral side of the partition wall structure 5 and each has a height substantially equal to or slightly larger than that of the core 3. A cooling medium is supplied to the reactor cooling heat exchangers 11 from an external supply source through a cooling medium supply tube 32 of double tube structure. The cooling medium supply tube 32 is connected to an air cooler 34 through a flanged portion 33 for the heat exchanger provided for the roof slab 1b and separated into two tubes at the inlet portion of the air cooler 34. The cooling medium is forcibly circulated in the air cooler 34 by a cooling medium circulation pump 35 such as an electromagnetic pump incorporated in one 33a of the separated tubes, thus performing the heat exchanging operation between the air and the cooling medium. The circulation pump 35 is driven by a control or operation unit, not shown, during the reactor operation stopping period, whereby the cooling medium is circulated in the reactor core cooling heat exchangers 11 and hence the cooling operation by the coolant 8 is carried out at the lower portion of the hot pool 6.

As described hereinbefore, during the steady operation period of the reactor, the coolant 8 is moved by the electromagnetic pumps 10 in the cold pool 7 and forcibly flown out into the plenum 2c of the core support structure 2 through the communication ports 12. The coolant 8 is then heated during the raising into the fuel assemblies 4 through the coolant inlets 15 and drained into the hot pool 6. The coolant 8 drained into the hot pool 6 into the intermediate heat exchangers 9 through the coolant inlets 23 and drained into the cold pool 7 disposed outside the partition wall structure 5 through the coolant outlets 24 after the heat exchanging and cooling operations with the secondary heat medium. In such operation, the fuel assemblies 4 arranged in the visinity of the inner peripheral surface of the core 3 are charged with the coolant flow-out ports 17 of the partition wall structure 5 being closed to thereby stop the flow-out of the coolant outside the core tank portion 5a through the coolant flow-out ports 17. The core cooling heat exchangers 11 are now in operation stopped condition.

In the periodical inspections, for example, the reactor stops in its operation and various visual workings are carried out. In such a case, according to the present embodiment, the free liquid surface level 8a of the opaque coolant 8 composed of liquid metal is lowered directly below the top portion of the core 3 and it makes thus possible to expose the machinaries or equipments arranged above the liquid surface 8a for the visual observation thereof. Namely, in the actual operation, the fuel assemblies 4 arranged near the peripheral surface of the core 3 are rotated by a fuel exchanger, not shown, to establish the communication between the coolant flow-out ports 16 of these fuel assemblies 4 and the coolant flow-out ports 17 of the core tank portion 5a of the partition wall structure 5, whereby the communication between the core 3 and the cold pool 7 is established at the directly below the core top portion, thus enabling the heat exchanging operation with the core cooling heat exchangers 11 to thereby cool the core 3 for removing the decay heat.

In the next step, the circulation pump 35 for the heat exchangers 11 is operated to forcibly circulate the cooling medium, whereby the heat exchanging operation between the atmosphere and the circulating cooling medium in the air cooler 34. The coolant 8 heated by the decay heat of the fuel assemblies is flown out into the cold pool 7 from the coolant flow-out ports 16 of the fuel assemblies 4 through the coolant flow-out ports 17 of the reactor tank portion 5a. In the cold pool 7, the coolant 8 is then subjected to the heat exchanging operation by the reactor cooling heat exchangers 11, thus safely performing the removal of the decay heat in the reactor core 3. The circulation of the cooling medium may be performed by the natural circulation system in stead of the forcible circulation system.

As described above, since the cooling of the core 3 can be continuously performed, the height of the free liquid surface 8a of the coolant 8 can be easily lowered to the level below the top portion, shown by an image line B in FIG. 1, of the fuel assemblies 4 by partially draining the coolant 8 externally to the reactor containment 1.

Furthermore, according to the present invention, it is not necessary to entirely remove the fuel assemblies outside the reactor vessel, and the inspections or maintenance of the respective machinaries or equipments such as intermediate heat exchangers 9, the core superstructure 3c, and the partition wall structure 5 can be done visually or by a remote controlled robot, for example, thus improving the economical merit as well as inspection or maintenance performance.

Moreover, since the partition wall structure 5 is only provided with, at the upper portion of the core tank portion 5a, the coolant flow-out ports 17 and holes 25 for the penetration of the coolant flow-out nozzles at the lower portion of the intermediate heat exchanges 9, there are not provided with large and complicated holes for the penetration of large machinaries or equipments such as heat exchanger pumps as made in the conventional technology, resulting in the realization of the simple structure of the reactor vessel itself. In addition, the equipments such as electromagnetic pumps 10 and the core cooling heat exchangers 11 can be easily inspected or maintained by removing the pump cover 31 and the heat exchanger flange portion 33 and then pulling outward them without no interference with the pertition wall structure 5 when pulled outwardly.

In the foregoing embodiment, the upper vertical portion 5c of the partition wall structure 5 is constructed as a large diameter portion and the intermediate heat exchangers 9 are arranged inside this wall portion 5c, i.e. hot pool 6, but the present invention is not limited to this arrangement.

Figure 8:
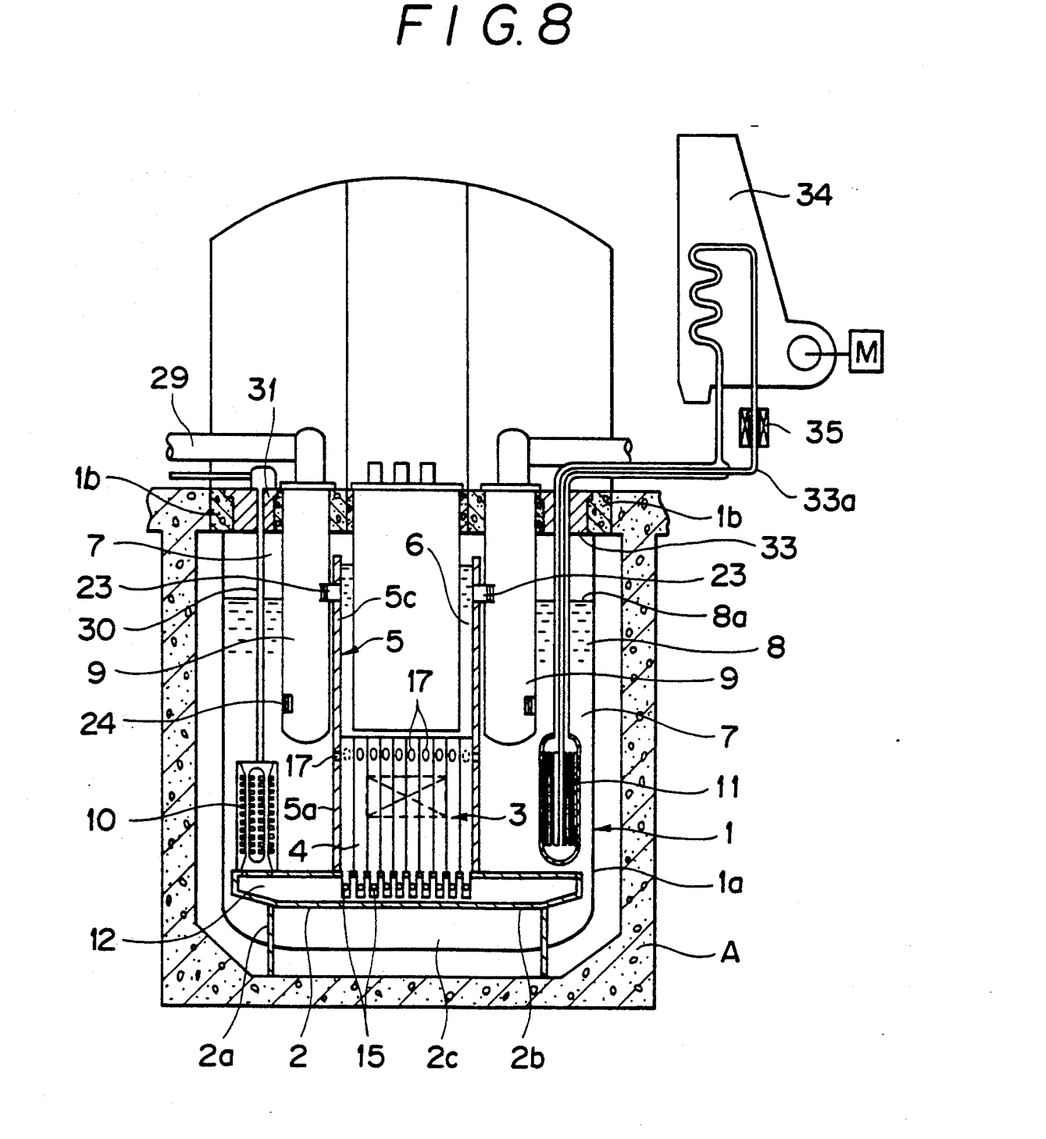
FIG. 8 is an elevational section similar to that of FIG. 1 showing another embodiment according to the present invention.

FIG. 8 therefore represents another embodiment of the present invention, in which the partition wall structure 5 is constructed as a cylindrical structure extending vertically from the core support structure 2 and having substantially a uniform diameter. In this embodiment, the intermediate heat exchangers 9 are arranged outside the partition wall structure 5, i.e. in the cold pool 7, wherein the coolant in the hot pool 6 is introduced through inlets 23 formed at upper portions of the wall structure 5. The other portions or members are substantially corresponding to those of the first embodiments and shown by adding the same reference numerals.

According to this embodiment, substantially the same effects and functions as those attained by the foregoing embodiment can be achieved. In particular, however, in the latter embodiment, since the intermediate heat exchangers are arranged in the cold pool, the thermal condition during the reactor running period may become gentle.

It is also to be understood that the present invention is not limited to the described embodiments and many other changes and modifications may be made without departing from the scope of the appended claim.

What is claimed is:

1. A tank type nuclear reactor comprising:
an outer shielding wall structure;
a reactor vessel installed in the shielding wall structure and provided with an inner sealed space in which a primary liquid coolant circulates;
a reactor core disposed in said reactor vessel and charged with a number of fuel assemblies;
a core support structure disposed to a bottom of the reactor vessel;
a partition wall means disposed on said core support structure defining the inner space of the reactor vessel into a hot pool region and a cold pool region, said partition wall means having a vertically cylindrical wall structure including a lower portion constituting a core tank portion surrounding an outer periphery of the core;
an intermediate heat exchanger means disposed in the reactor vessel for carrying out heat exchanging operation between the liquid coolant flow from the hot pool region and a secondary side heat medium;
a pump means disposed in the reactor vessel for feeding the primary coolant into the core, said intermediate heat exchanger means and said pump means being arranged along a peripheral wall surface of the partition wall means; and
a core cooling heat exchanger means disposed on an outer peripheral wall side of said partition wall means and having a top portion of a level substantially equal to or below a top portion of said core.

2. A nuclear reactor according to claim 1, wherein said partition wall structure is provided with coolant flow holes facing said pump means, said intermediate heat exchanger means and said core cooling heat exchanger means.

3. A nuclear reactor according to claim 2, wherein coolant flow holes facing the core cooling heat exchanger means is closed or opened by selectively changing charging orientation of the fuel assemblies disposed on a peripheral side of the core during reactor running period or reactor operation stopping period.

4. A nuclear reactor according to claim 1, wherein said partition wall means has a vertical cylindrical structure including a lower cylindrical portion constituting a core tank portion and an upper cylindrical portion having an inner diameter larger than that of the lower cylindrical portion.

5. A nuclear reactor according to claim 4, wherein the intermediate heat exchanger means is disposed in the hot pool region inside the upper cylindrical portion of the partition wall means.

6. A nuclear reactor according to claim 1, wherein said partition wall means has a vertical cylindrical structure including a lower cylindrical portion constituting a core tank portion and an upper cylindrical portion having an inner diameter substantially equal to that of the lower cylindrical portion.

7. A nuclear reactor according to claim 6, wherein the intermediate heat exchanger means is disposed in the cold pool region outside the upper cylindrical portion of the partition wall means.

8. A nuclear reactor according to claim 1, wherein said intermediate heat exchanger means comprises a plurality of heat exchangers and said pump means comprises a plurality of electromagnetic pumps, which are arranged respectively circumferentially with substantially equal spaces with each other.

* * * * *